United States Patent [19]
Horstein et al.

[11] Patent Number: 5,433,726
[45] Date of Patent: Jul. 18, 1995

[54] MEDIUM-EARTH-ALTITUDE SATELLITE-BASED CELLULAR TELECOMMUNICATIONS SYSTEM

[75] Inventors: Michael Horstein, Los Angeles; Peter H. Cress, Manhattan Beach; Roger J. Rusch, Palos Verdes Estates, all of Calif.

[73] Assignee: TRW Inc., Redondo Beach, Calif.

[21] Appl. No.: 890,510

[22] Filed: May 28, 1992

Related U.S. Application Data

[63] Continuation-in-part of Ser. No. 688,412, Apr. 22, 1991, abandoned.

[51] Int. Cl.⁶ .................... B64G 1/100; H04B 7/185
[52] U.S. Cl. ................... 244/158 R; 455/12.1; 455/13.1
[58] Field of Search .......... 244/158 R; 455/7, 12.1, 455/13.1–13.3, 33.1, 33.3, 54.1, 56.1; 342/352, 353, 357, 354, 355, 359, 368

[56] References Cited

U.S. PATENT DOCUMENTS

| | | |
|---|---|---|
| 3,243,706 | 3/1966 | Grisham. |
| 3,331,071 | 7/1967 | Webb. |
| 3,340,531 | 9/1967 | Kefalas et al.. |
| 3,349,398 | 10/1967 | Werth et al.. |
| 3,384,891 | 5/1968 | Anderson. |
| 3,497,807 | 1/1970 | Newton et al.. |
| 3,678,387 | 7/1972 | Wilson. |
| 3,710,027 | 1/1973 | Herter et al.. |
| 3,928,804 | 12/1975 | Schmidt et al.. |
| 4,018,993 | 4/1977 | Edström. |
| 4,109,202 | 8/1978 | Kudsia et al.. |
| 4,144,495 | 3/1979 | Metzger. |
| 4,189,675 | 2/1980 | Reilly et al.. |
| 4,201,992 | 5/1980 | Welti. |
| 4,220,821 | 9/1980 | Lucas. |
| 4,232,321 | 11/1980 | Ohm. |
| 4,398,291 | 8/1983 | Hotta et al.. |
| 4,418,350 | 11/1983 | Rosen. |
| 4,425,639 | 1/1984 | Acampora et al.. |

(List continued on next page.)

FOREIGN PATENT DOCUMENTS

| | | |
|---|---|---|
| 0365885 | 10/1988 | European Pat. Off.. |
| 0365885 | 10/1989 | European Pat. Off.. |
| 0510789 | 4/1991 | European Pat. Off.. |

(List continued on next page.)

OTHER PUBLICATIONS

Nauck et al, "The Lospuc Concept and it positions" Z. Flugwiss, weltrumforsch, 12 (1988) 191–196.

Bleazard, *Introducing Satellite Communications* 1986, pp. 68–71.

E.P. 0059454, Dondl, Sep. 1982.

(List continued on next page.)

*Primary Examiner*—Galen L. Barefoot
*Attorney, Agent, or Firm*—William J. Coughlin; Sol L. Goldstein

[57] ABSTRACT

A satellite-based cellular telecommunications system employing a constellation of telecommunications satellites in medium earth orbit to provide multibeam radio frequency (rf) communications links for worldwide cellular telephone service with a minimum number of satellites. The telecommunications satellites are placed in a plurality of inclined orbits about the earth at an altitude of between approximately 5600 and 10,000 nautical miles. The characteristics of the orbits, such as the number of orbits, the inclination of each orbit, the number of satellites in each orbit and the altitude of the satellites, are tailored to maximize the coverage area of the satellites and their related line-of-sight elevation angles, while minimizing propagation time delays, the number of beam-to-beam and satellite-to-satellite handovers, and the total number of satellites. The present invention also includes several additional features which essentially eliminate beam-to-beam and satellite-to-satellite handovers, thus dramatically reducing the likelihood of dropouts.

35 Claims, 2 Drawing Sheets

U.S. PATENT DOCUMENTS

| | | |
|---|---|---|
| 4,455,651 | 6/1984 | Baran . |
| 4,581,736 | 4/1986 | Dobyns et al. . |
| 4,599,619 | 7/1986 | Keigler et al. . |
| 4,616,108 | 10/1986 | Yamaguchi et al. . |
| 4,628,506 | 12/1986 | Sperlich . |
| 4,630,058 | 12/1986 | Brown .................................. 342/359 |
| 4,672,655 | 6/1987 | Koch . |
| 4,672,656 | 6/1987 | Pfeiffer et al. . |
| 4,690,354 | 9/1987 | Frisch . |
| 4,691,882 | 9/1987 | Young . |
| 4,792,813 | 12/1988 | Rosen . |
| 4,809,006 | 2/1989 | Dar . |
| 4,809,935 | 3/1989 | Draim . |
| 4,813,036 | 3/1989 | Whitehead . |
| 4,819,227 | 4/1989 | Rosen . |
| 4,827,421 | 5/1989 | Dondl . |
| 4,854,527 | 8/1989 | Draim . |
| 4,868,886 | 9/1989 | Assal et al. . |
| 4,872,015 | 10/1989 | Rosen . |
| 4,897,642 | 1/1990 | DiLullo et al. . |
| 4,931,802 | 6/1990 | Assal et al. . |
| 4,943,808 | 7/1990 | Dulck et al. . |
| 4,985,706 | 1/1991 | Schukat . |
| 5,006,855 | 4/1991 | Braff . |
| 5,010,317 | 4/1991 | Schwendeman et al. . |
| 5,017,925 | 5/1991 | Bertiger et al. . |
| 5,023,900 | 6/1991 | Tayloe et al. . |
| 5,025,485 | 6/1991 | Csongor et al. . |
| 5,038,398 | 8/1991 | Wills . |
| 5,053,782 | 10/1991 | Levinberg et al. . |
| 5,073,900 | 12/1991 | Mallinckrodt . |
| 5,119,225 | 6/1992 | Grant et al. . |
| 5,121,409 | 6/1992 | Goss . |
| 5,121,503 | 6/1992 | Davis . |
| 5,161,248 | 11/1992 | Bertiger et al. . |
| 5,184,139 | 2/1993 | Hirako et al. . |
| 5,187,805 | 2/1993 | Bertiger ............................. 455/13.1 |
| 5,287,541 | 2/1994 | Davis et al. ........................ 455/13.1 |
| 5,408,237 | 4/1995 | Patterson et al. .................. 455/12.1 |
| 5,410,728 | 4/1995 | Bertiger ............................. 455/13.1 |

FOREIGN PATENT DOCUMENTS

| | | |
|---|---|---|
| 0331567 | 3/1988 | France . |
| 0331567 | 2/1989 | France . |
| 0059454 | 2/1981 | Germany . |
| 0237009 | 3/1986 | Germany . |
| 0237009 | 9/1987 | Germany . |

OTHER PUBLICATIONS

Rider "Analytic Design of Satellite Constellations . . . " *Journal of the Astronautical Sciences*, vol. 3, No. 1, pp. 31, 52: Jan. 1986.

Nauslar Global Positioning Sys, Brochure by Space and Missile Sys Organization, 1973.

Walker, Circular Orbit Patterns; "Providing continuous Whole Earth Coverage", Royal Aircraft Establishment Tech rep 70211 Nov. 1970.

D. G. C. Luck, "System Organization For General Communication Via Medium Altitude Satellites," RCA Review, Sep. 1963, pp. 293–324.

Lang, Thomas J. et al., "Orbital Constellations Which Minimize Revisit Time," AAS 83–402, pp. 1076–1086 (1991).

Lang, Thomas J., "Symmetric Circular Orbit Satellite Constellations For Continuous Global Coverage," AAS 87–499, pp. 1111–1132 (1991).

Luck, D. G. C., "System Organization for General Communication Via Medium Altitude Satellites," RCA Review, pp. 293–324 (1963).

Adams, W. S. et al., "Circular Polar Constellations Providing Continuous Single or Multiple Coverage Above a Specified Latitude," *The Journal of the Astronautical Sciences*, vol. 35, No. 2, pp. 155–192 (1987).

American Astronautical Society Publication, "Advances in the Astronautical Sciences," vol. 9 (1961).

Ballard, A. H., "Rosette Constellations of Earth Satellites," *IEEE*, vol. AES-16, No. 5, pp. 656–673 (1980).

Benedicto, J. et al., "MAGSS-14: A Medium–Altitude Global Mobile Satellite System for Personal Communications at L–band," ESTEC (1992).

Beste, D. C., "Design of Satellite Constellations for Optimal Continuous Coverage," *IEEE Transactions on Aerospace and Electronic Systems*, AES-14, No. 3, pp. 466–473 (1978).

Clare, L. P. et al., "Multiple Satellite Networks: Performance Evaluation Via Simulation," *Milcom*, vol. 2, No. 20, pp. 404–411 (1987).

Cline, J. K. et al., "Quasicircular Ground Tracks for Geosynchronous Earth Satellites," *J. Spacecraft*, vol. 23, No. 2, pp. 144–148 (1986).

Dondl, Peter, "Digital Network Oriented Mobile Radio (List continued on next page.)

OTHER PUBLICATIONS

Satellite System as an Integrated Part of the GSM Cellular Radio System in Europe".

Draim, J. E. et al., "Satellite Constellation for Optimal Northern Hemispere Coverage," Presentation at Ninth DARPA Strategic Space Symposium (1983).

Draim, J. E., "Three- and Four-Satellite Continuous-Coverage Constellations," AIAA, AIAA/AAS Astrodynamics Conference (1984).

Draim, J. E., "Three- and Four-Satellite Continuous-Coverage Constellations," *J. Guidance*, vol. 8, No. 6, pp. 725-730 (1985).

Draim, J. E., "A Common Period Four-Satellite Continuous Global Coverage Constellation," AIAA, pp. 1-9 (1986).

Kachmar, Michael, "Land-mobile satellite pick up," Microwaves & RF, pp. 33-35, Aug. 1984.

Mozhaev, G. V., "The Problem of Continuous Earth Coverage and Kinematically Regular Satellite Networks.II," pp. 52-61 (1973).

Neyret, P. et al., "The Intelsat VII Spacecraft," AIAA 13th Communications, Satellite Systems Conference, Los Angeles, California, pp. 1-16, Mar. 1990.

Rafferty, W. et al., "RF Development for Mobile-Satellite Systems," MSN & CT, pp. 28-30, 37 (1988).

Schmidt, F. et al., "Electronically Steered Phased-Array Antenna for MSAT," MSN & CT, pp. 41-43 (1988).

Space Handbook, "Satellite Ground Tracks," Air University, pp. 2-38 to 2-46.

Wadsworth, D., "Longitude-reuse Plan Doubles Communication Satellite Capacity of Communication Satellite Capacity of Geostationary Arc," AIAA 8th Communications Satellite Systems Conference, pp. 198-204 (1980).

Walker, J. G., "Some Circular Orbit Patterns for Whole Earth Coverage," Technical Memo 149, Royal Aircraft Establishment (1970).

Walker, J. G., "Continuous Whole-Earth Coverage by Circular-Orbit Satellite Patterns," Technical Report 77044, Defense Technical Information Center (1977).

Walker, J. G., "Satellite Patterns for Continuous Multiple Whole-Earth Coverage," Royal Aircraft Establishment, pp. 119-122 (1977).

Walker, J. G., "Coverage Predictions and Selection Criteria for Satellite Constellations," Technical Report 82116, Royal Aircraft Establishment (1982).

"The Effects of Time Delay and Echoes on Telephone Conversations", by J. W. Emling and D. Mitchell, dated Aug. 9, 1963, pp. 2869-2891, The Bell System Technical Journal, Nov. 1963.

"Customer Evaluation of Telephone Circuits with Delay", by George K. Helder, dated Jun. 9, 1966, pp. 1157-1191, The Bell System Technical Journal, Sep., 1966.

"Effects of Transmission Delay on Conversational Behavior on Echo-Free Telephone Circuits", by Paul T. Brady, dated Aug. 25, 1970, pp. 115-133, The Bell System Technical Journal, Jan. 1971.

MEDIUM-EARTH-ALTITUDE SATELLITE-BASED CELLULAR TELECOMMUNICATIONS SYSTEM

CROSS-REFERENCED TO RELATED APPLICATION

This is a continuation-in-part of Ser. No. 07/688,412 filed on Apr. 22, 1991, now abandoned, by Michael Horstein, et al., entitled "Cellular Telephone Satellite System."

BACKGROUND OF THE INVENTION

This invention relates generally to cellular telecommunications systems and, more particularly, to satellite-based cellular telecommunications systems.

The use of mobile cellular telephones has proliferated in the many large metropolitan areas in which cellular telecommunications systems have been installed. Cellular telecommunications systems provide voice communications between a mobile telephone user and fixed telephone users or to other mobile telephone users, as well as data communications for mobile facsimile machines and modem-equipped computers. A typical cellular telephone systems includes a grid of service zones or cells, with each cell having a base station situated near its center. A mobile telephone user located in a particular cell is connected to that cell's base station through low-power radio frequency (rf) transmissions. Each base station is connected by trunk lines to a gateway station, which is connected by trunk lines to a local and long distance telephone network.

The cellular telecommunications systems in use today are generally land-based systems that have been installed in large metropolitan areas. Small towns and rural areas cannot economically justify the installation and operation of one of these relatively costly systems. To provide cellular telephone service for these areas, satellite-based cellular telecommunications systems have been proposed which would provide world-wide cellular telephone service. These proposed cellular telephone systems typically include a large constellation of telecommunications satellites in low earth orbit at an altitude of between approximately 400 and 1000 nautical miles, which is just below the Van Allen radiation belt. At these low altitudes, as many as 50 to 80 satellites are required to provide adequate coverage of the entire earth. This results in an extremely costly and complex system with a large number of rapidly changing cross-links and a large number of bean-to-beam and satellite-to-satellite handovers. Accordingly, there has been a need for a less costly ad complex satellite-based cellular telecommunications system. The present invention clearly fulfills this need.

SUMMARY OF THE INVENTION

The present invention resides in a satellite-based cellular telecommunications system employing a constellation of telecommunications satellites in medium altitude earth orbit to provide multibeam radio frequency (rf) communications links for world-wide cellular telephone service with a minimum number of satellites. The telecommunications satellites are placed in a plurality of inclined orbits about the earth at an altitude of between approximately 5600 and 10,000 nautical miles. The characteristics of the orbits, such as the number of orbits, the inclination of each orbit, the number of satellites in each orbit and the altitude of the satellites, are tailored to maximize the coverage area of the satellites and their related line-of-sight elevation angles, while minimizing propagation time delays, the number of beam-to-beam and satellite-to-satellite handovers, and the total number of satellites.

The present invention also includes several additional features which essentially eliminate beam-to-beam and satellite-to-satellite handovers, thus dramatically reducing the likelihood of dropouts. One of these important features is an assignment of each satellite to a sequence of fixed service regions (rather than a continuously varying coverage area) during each satellite's orbit. The boresight of the satellite's antennas remains centered on a given assigned service region during the entire time the service region is visible to the satellite. This results in a essentially fixed beam pattern thus practically eliminating beam-to-beam handovers. Another one of these important features is a provision for overlap in the coverage of each service region by tow successive satellites during the transition in service from one satellite to another. All calls that are placed during the overlap interval are assigned to the arriving satellite. Therefore, only calls placed prior to the overlap interval and extending beyond the overlap interval are subjected to satellite-to-satellite handovers when departing satellite is reoriented to its new service region.

In one preferred embodiment of the present invention, a constellation of nine satellites provides complete global coverage of the earth by at least one satellite at all times with a minimum elevation angle of 10°. The constellation includes three inclined circular orbital planes which are evenly spaced about the earth with ascending nodes at 120° intervals about the equator. Three satellites are placed in each orbit and evenly spaced at 120° intervals at an altitude of 5600 nautical miles. Each orbital plane is inclined at an angle of 55 relative to the equatorial plane. In another preferred embodiment of the invention, a constellation of twelve satellites provides global coverage of the earth by at least two satellites at all times with a minimum elevation angle of 10°. The constellation includes three inclined circular orbital planes with the same characteristics as the nine satellite constellation, except that four satellites are placed in each orbit, evenly spaced at 90° intervals. Two additional embodiments are disclosed which use elliptical orbits to provide hemispheric coverage of the earth by at least one and two satellites, respectively, at all times with a minimum elevation angle of 10°.

It will be appreciated from the foregoing that the present invention represents a significant advance in the field of satellite-based cellular telecommunications systems. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENTS

As shown in the drawings for purposes of illustration, the present invention is embodied in a satellite-based cellular telecommunications system employing a constellation of telecommunications satellites in medium earth orbit to provide multibeam radio frequency (rf) communications links for world-wide cellular telephone service with a minimum number of satellites. The telecommunications satellites are placed in a plurality of inclined orbits about the earth at an altitude of between approximately 5600 and 10,000 nautical miles. The characteristics of the orbits, such as the number of orbits, the inclination of each orbit, the number of satellites in each orbit and the altitude of the satellites, are tailored to maximize the coverage area of the satellites and their related line-of-sight elevation angles, while minimizing propagation time delays, the number of beam-to-beam and satellite-to-satellite handovers, and the total number of satellites. The present invention also includes several additional features which essentially eliminate beam-to-beam and satellite-to-satellite handovers, thus dramatically reducing the likelihood of dropouts.

Figure 1:
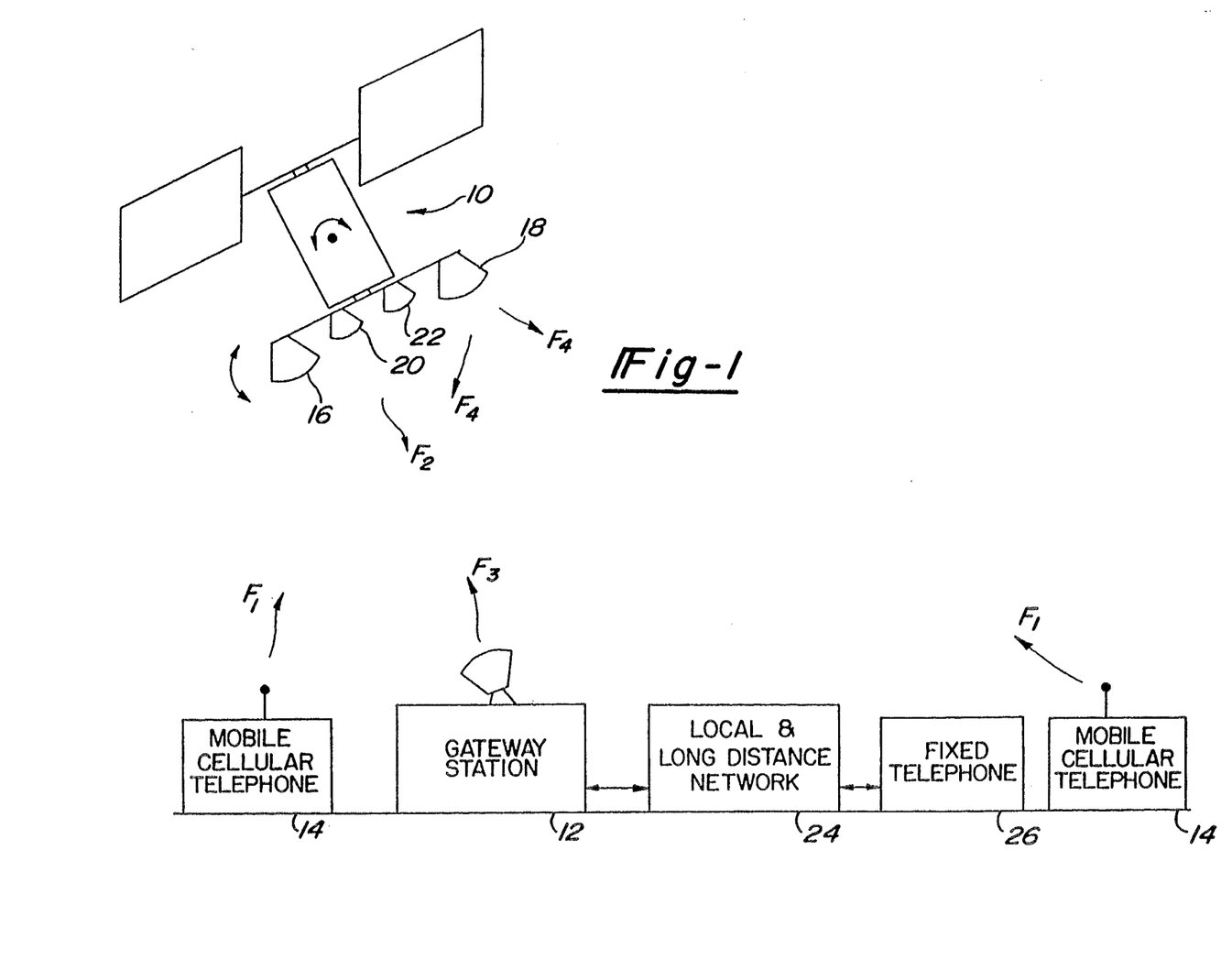
FIG. 1 is a schematic illustration of a satellite-based cellular telecommunications system in accordance with the present invention.

FIG. 1 illustrates a satellite-based cellular telecommunications system in accordance with the present invention. The cellular telecommunications system includes a constellation of telecommunications satellites 10 in medium earth orbit, a gateway station 12 situated in each region serviced by the satellites and a plurality of mobile cellular telephones 14 located in the service region of the satellite 10. The mobile cellular telephones 14 can also include mobile facsimile machines and modem-equipped computers. The telecommunications satellite 10 provides a multibeam rf communications link with the mobile cellular telephones 14 using two multibeam antennas 16, 18 and an rf communications link with the gateway station 12 using two antennas 20, 22. Multibeam antenna 16 receives rf signals from the mobile cellular telephones 14 on frequency band $F_1$. The satellite 10 then amplifies, translates and transmits the rf signals down to the gateway station 12 on frequency band $F_2$ using antenna 20. The gateway station 12 is connected by trunk lines to a local and long distance telephone network 24, which provides connections to a fixed telephone 26. Rf signals are transmitted from the gateway station 12 back to the telecommunications satellite 10 on frequency band $F_3$ and received using antenna 22. The satellite 10 then amplifies, translates and transmits the rf signals back down to the mobile cellular telephones 14 on frequency band $F_4$ using multibeam antenna 18.

Various types of connections are possible between the different users of the cellular telecommunications system of the present invention. A mobile telephone user can communicate with another mobile telephone user in the same service region of the satellite 10 or in the service region of another satellite 10, or with a fixed telephone user located anywhere in the world. If in communication with another mobile telephone user in the same service region, the rf signals are transmitted up from the mobile cellular telephone 14 to the satellite 10, then down to the gateway station 12, then back up to the satellite 10, and then down to the other mobile cellular telephone 14, and vice versa. This type of connection requires a double hop, which doubles the propagation time delay. If in communication with another mobile telephone user in a different service region, the rf signals are transmitted up from the mobile cellular telephone 14 to the satellite 10, then down to the gateway station 12, then through the local and long distance network 24, as necessary, to the gateway station 12 responsible for the other service region, then up to the satellite 10 responsible for the other service region, and then down to the other mobile cellular telephone 14, and vice versa. This type of connection also requires a double hop. If in communication with a fixed telephone user, the rf signals are transmitted up from the mobile cellular telephone 14 to the satellite 10, then down to the gateway station 12, and then through the local and long distance network 24, as necessary, to the fixed telephone 26, and vice versa. This type of connection requires only a single hop.

In an alternative embodiment of the present invention, the satellite 10 performs the function of the gateway station 12 for communications between mobile telephone users located in the same service region, thus requiring only a single hop. In this type of connection, the rf signals are transmitted up from the mobile cellular telephone 14 to the satellite 10, the satellite 10 then performs signal processing on the rf signals to provide any necessary switching between the multiple beams, and then the rf signals are transmitted back down to the other mobile cellular telephone 14, and vice versa.

The propagation time delay depends on the altitude of the telecommunications satellite 10 and the location of the mobile cellular telephones 14 in the service region. In the present invention, at an altitude of between 5600 and 10,000 nautical miles, the time delay from the satellite 10 to the ground and vice versa is limited to 60 msec. Therefore, the single hop time delay is limited to 120 msec. At an altitude of 5600 nautical miles, the one hop time delay between two mobile cellular telephones 14 located directly below the satellite 10 is 69 msec., while the one hop time delay between two mobile cellular telephones 14 spaced apart at the minimum elevation angle of 10° is 96 msec.

The relationship between station to station propagation time and satellite altitude for a single hop from a station on the ground up to the satellite and back down to the station at maximum range, which occurs when the satellite is at a minimum elevation of 10°, may be shown as follows:

| Satellite Altitude naut. mi. | Maximum Station to Satellite Propagation Range naut. mi. | Maximum Station to Station Propagation Time msec. |
| --- | --- | --- |
| 5500 | 7656 | 94 |
| 6000 | 8191 | 101 |
| 6500 | 8724 | 108 |
| 7000 | 9255 | 115 |
| 7500 | 9782 | 121 |

It should be understood that the propagation time delay increases with the magnitude of the altitude in the relationship set forth in this table. Accordingly, the maximum propagation delay time at 10,000 nautical miles will be approximately 153 milliseconds (at the minimum elevation angle of 10°).

It should be understood that the propagation time delay increases with the magnitude of the altitude in the relationship set forth in this table. Accordingly, the maximum propagation delay time at 10,000 nautical miles will be approximately 153 milliseconds (at the minimum elevation angle of 10°).

The mobile cellular telephones 14 and the gateway station 12 are within view of the satellite 10 at all times at an elevation angle of at least 10°. As the satellite 10 moves out of view of the mobile cellular telephones 14 in a particular service region, another satellite 10 from the constellation comes into view. Each satellite 10 has a relatively narrow antenna footprint that is considerably smaller than the total area of visibility of the satellite. This is because it is not practical to serve the entire area of visibility due to power and complexity constraints.

The service region actually covered by the satellite 10 is determined by the composite coverage of the multibeam antennas 16, 18 has 19 beams for a composite footprint coverage of about 23°. Another ring of feeds can be added to the multibeam antenna to provide 37 beams for a composite footprint coverage of about 35°. Each beam has field of view (FOV) of about 5° and is capable of operating with a ½ W mobile cellular telephone 14 having an omni-directional antenna.

The present invention also includes several additional features which essentially eliminate beam-to-beam and satellite-to-satellite handovers, thus dramatically reducing the likelihood of dropouts. One of these important features is an assignment of each satellite to a sequence of fixed service regions during each satellite's orbit. The boresight of the satellite's antennas 16, 18 remains centered on the assigned service region is visible to the satellite with respect to antennas 20, 22 they are gimballed to point to the appropriate gateway station. The resulting nearly-fixed antenna beam pattern practically eliminates beam-to-beam handovers. The antenna boresight remains centered on the service region either by adjusting the attitude of the spacecraft 10 or by rotating gimballed antennas.

Another one of the important features of the present invention is a provision for overlap in the coverage of each service region by two successive satellites during the transition in service from one satellite to another. All calls that are placed during the overlap interval are assigned to the arriving satellite. Therefore, only calls placed prior to the overlap interval are extending beyond the overlap interval are subjected to satellite-to-satellite handovers when the departing satellite is reoriented to its new service region.

In the preferred embodiments of the present invention, the constellation of telecommunications satellites 10 has three inclined orbital planes which are evenly spaced about the earth with ascending nodes at 120° intervals about the equator. The satellites 10 are placed in medium earth orbit at an altitude of between 5600 and 10,000 nautical miles. This range of altitudes is above the Van Allen radiation belt, but substantially below the altitude for geosynchronous orbit. This provides good visibility with a minimum number of satellites without excessive power requirements. At least one of the telecommunications satellites 10 is visible at all times from each mobile cellular telephone 14 and gateway station 12 at an elevation angle of at least 10° to prevent shadowing.

Figures 2, 3, 4, 5:
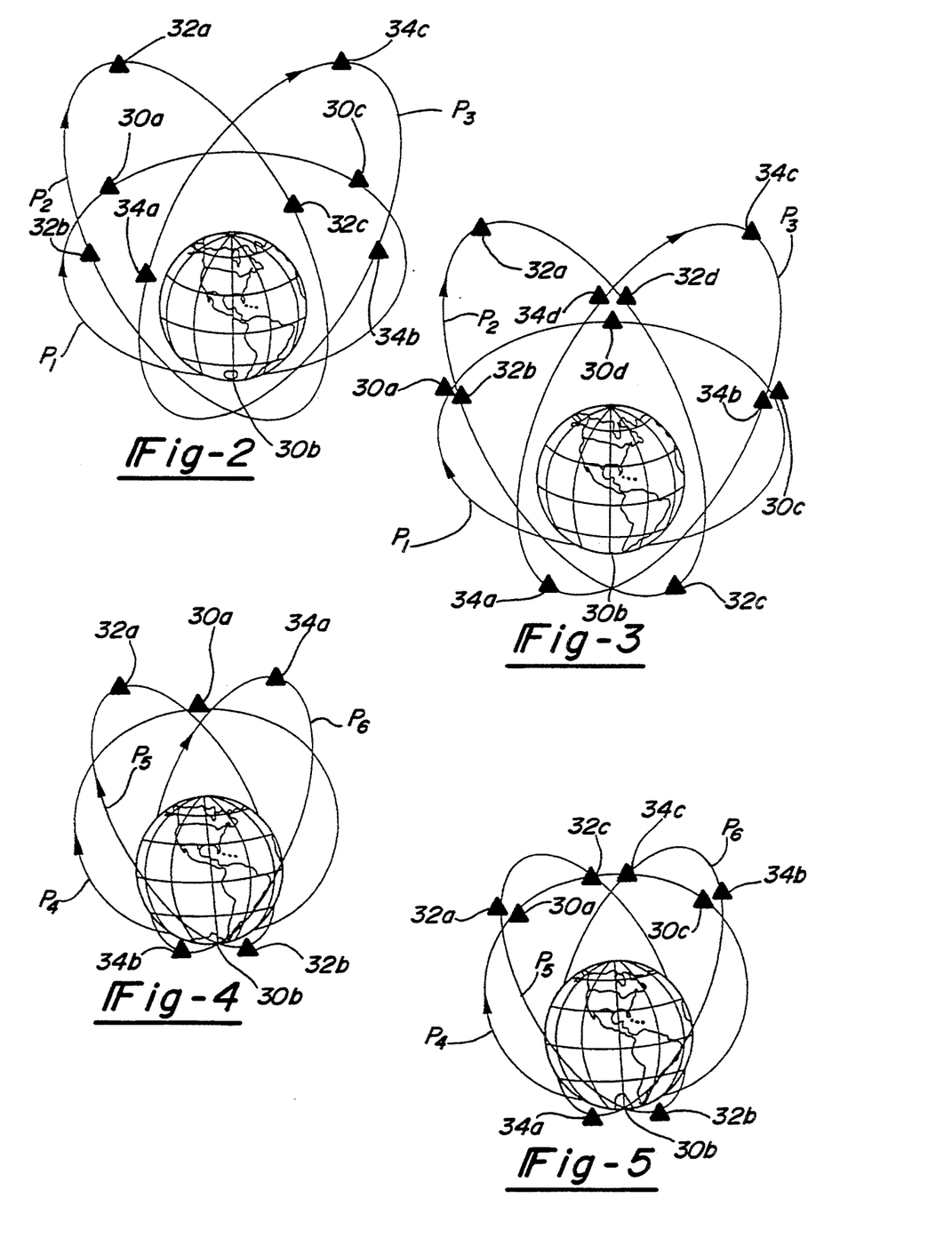
FIG. 2 is a schematic illustration of a constellation of telecommunication satellites providing single global coverage of the earth.
FIG. 3 is a schematic illustration of a constellation of telecommunication satellites providing double global coverage of the earth.
FIG. 4 is a schematic illustration of a constellation of telecommunication satellites providing single hemispheric coverage of the earth.
FIG. 5 is a schematic illustration of a constellation of telecommunication satellites providing double hemispheric coverage of the earth.

FIG. 2 shows a constellation of nine satellites which provides global coverage of the earth by at least one satellite 10 at all times with a minimum elevation angle of 10°. The nine satellites are arranged in three circular orbital planes $P_1$, $P_2$, $P_3$, with three satellites $30a-30c$ located in orbital plane $P_1$, three satellites $32a-32c$ located in orbital plane $P_2$ and three satellites $34a-34c$ located in orbital plane $P_3$. The satellites are evenly spaced at 120° intervals in each orbital plane at an altitude of 5600 nautical miles. Each orbital plane is inclined at an angle of 55° relative to the equatorial plane. The relative phase angles between the satellites in different orbital planes is 80°. Therefore, before one satellite in the constellation disappears from a user's view, at least one additional satellite comes into view above an elevation angle of 10°.

FIG. 3 shows a constellation of twelve satellites which provides global coverage of the earth by at least two satellites at all times with a minimum elevation angle of 10°. The twelve satellites are arranged in the three circular orbital planes $P_1$, $P_2$, $P_3$, with four satellites $30a-30d$ located in orbital plane $P_1$, four satellites $32a-32d$ located in orbital plane $P_2$ and four satellites $34a-34d$ located in orbital plane $P_3$. The satellites are evenly spaced at 90° intervals in each orbital plane at an altitude of 5600 nautical miles. Each orbital plane is inclined at an angle of 55° relative to the equatorial plane. The relative phase angles between satellites in different orbital planes is 90°.

A constellation of telecommunications satellites in circular orbits is preferred for providing global coverage, but a constellation of telecommunications satellites in elliptical orbits is preferred for coverage of limited areas, such as one hemisphere. FIG. 4 shows a constellation of six satellites which provides hemispheric coverage of the earth by at least one satellite at all times with a minimum elevation angle of 10°. The six satellites are arranged in three elliptical orbital planes $P_4$, $P_5$, $P_6$, with two satellites $30a-30b$ located in orbital plane $P_4$, two satellites $32a-32b$ located in orbital plane $P_5$ and two satellites $34a-34b$ located in orbital plane $P_6$. Each orbital plane is defined by an apogee altitude of 6300 nautical miles, a perigee altitude of 600 nautical miles, an inclination angle of 63.4°, an ascending node spacing of 120°, an argument of perigee of 270°, and a relative phase angle between satellites in different orbits of 180°. By placing the apogee at the northernmost latitude reached by the satellite, which is also equal to the inclination angle, the coverage period for the northern latitude is maximized.

FIG. 5 shows a constellation of nine satellites which provides hemispheric coverage of the earth by at least two satellites at all times with a minimum elevation angle of 10°. The nine satellites are arranged in three elliptical orbital planes $P_4$, $P_5$, $P_6$, with three satellites $30a-30c$ located in orbital plane $P_4$, three satellites $32a-32c$ located in orbital plane $P_5$ and three satellites $34a-34c$ located in orbital plane $P_6$. Each orbital plane is defined by an apogee altitude of 6300 nautical miles, a perigee altitude of 600 nautical miles, an inclination angle of 63.4°, an ascending node spacing of 120°, an argument of perigee of 270°, and a relative phase angle between satellites in different orbits of 180°.

|  | Coverage | | | |
|---|---|---|---|---|
|  | Global | | Hemispheric | |
|  | Single | Double | Single | Double |
| Number of Satellites | 9 | 12 | 6 | 9 |
| Number Orbital Planes | 3 | 3 | 3 | 3 |
| Satellites per Plane | 3 | 4 | 2 | 3 |
| Apogee Altitude (nm) | 5600 | 5600 | 6300 | 6300 |
| Perigee Altitude (nm) | 5600 | 5600 | 600 | 600 |
| Inclination Angle | 55° | 55° | 63.4° | 63.4° |

-continued

| | Coverage | | | |
|---|---|---|---|---|
| | Global | | Hemispheric | |
| | Single | Double | Single | Double |
| Ascending Node Spacing | 120° | 120° | 120° | 120° |
| Argument of Perigee | 0° | 0° | 270° | 270° |
| Relative Phase Angle | 80° | 90° | 180° | 120° |
| Minimum Elevation Angle | 10° | 10° | 10° | 10° |

The constellations providing single satellite coverage can be initially formed and then the coverage expanded later to provide double coverage by the addition of only three satellites. Conversely, the constellations providing double coverage allow for the failure of one satellite in each orbital plane without the loss of full service. The position of the remaining satellites in the orbital plane can be adjusted to provide single coverage until the satellite is repaired or replaced.

From the foregoing, it will be appreciated that the present invention represents a significant advance in the field of satellite-based cellular telecommunications systems. Although several preferred embodiments of the invention have been shown and described, it will be apparent that other adaptations and modifications can be made without departing from the spirit and scope of the invention. Accordingly, the invention is not to be limited, except as by the following claims.

We claim:

1. A method of providing medium-earth-orbit satellite-based communications between low-power mobile handsets having an omni-directional antenna and a gateway station through a satellite forming part of a satellite constellation, comprising the steps of:
    launching a plurality of satellites to an orbiting altitude between 5600 and 10,000 nautical miles, wherein at least one satellite has a reduced antenna field of view (FOV) less than full earth coverage;
    orienting said satellites in a plurality of orbital planes which are inclined at a predetermined inclination angle with respect to the equatorial plane of the earth;
    receiving, by at least one of said satellites, radio frequency (RF) signals from a plurality of mobile handsets which transmit said RF signals using their omni-directional antennas; and
    overlapping a portion of a coverage region of a departing satellite with a portion of a coverage region of an arriving satellite, including assignment means having a predetermined criterion of assignment that calls placed to or from a user located within the coverage overlap region are assigned to said arriving satellite.

2. The method of providing medium-earth-orbit satellite-based communications of claim 1 further comprising the step of:
    assigning a plurality of repeating coverage regions to each satellite.

3. The method of providing medium-earth-orbit satellite-based communications of claim 2 further comprising the step of:
    periodically adjusting the attitude of at least one satellite to direct an antenna boresight on coverage regions assigned thereto.

4. The method of providing medium-earth-orbit satellite-based communications of claim 2 further comprising the step of:
    periodically gimballing and rotating an antenna of at least one satellite to direct an antenna boresight on coverage regions assigned thereto.

5. The method of providing medium-earth-orbit satellite-based communications of claim 1 wherein ascending nodes of said satellites orbiting in said orbital planes are evenly spaced on said equatorial plane.

6. The method of providing medium-earth-orbit satellite-based communications of claim 1 wherein orbits of said plurality of satellites are approximately circular.

7. The method of providing medium-earth-orbit satellite-based communications of claim 1 wherein orbits of said plurality of satellites are approximately elliptical.

8. The method of providing medium-earth-orbit satellite-based communications of claim 7 wherein said plurality of satellites orbit in three orbital planes, and wherein ascending nodes of said satellites orbiting in said orbital planes are spaced 120° on said equatorial plane.

9. The method of providing medium-earth-orbit satellite-based communications of claim 8 wherein said inclination angle is approximately 55°, said orbit is approximately circular and said orbiting altitude is 5600 nautical miles.

10. The method of providing medium-earth-orbit satellite-based communications of claim 9 wherein each orbital plane includes three satellites and wherein global coverage is continuously provided by at least one satellite.

11. The method of providing medium-earth-orbit satellite-based communications of claim 9 wherein each orbital plane includes four satellites and wherein global coverage is continuously provided by at least two satellites.

12. The method of providing medium-earth-orbit satellite-based communications of claim 8 wherein said inclination angle is approximately 63.4°, said orbit is approximately elliptical, an apogee altitude is 6300 nautical miles, and a perigee altitude is 600 nautical miles.

13. The method of providing medium-earth-orbit satellite-based communications of claim 12 wherein each orbital plane includes two satellites and wherein hemispheric overage is continuously provided by at least one satellite.

14. The method of providing medium-earth-orbit satellite-based communications of claim 12 wherein each orbital plane includes three satellites and wherein hemispheric coverage is provided by at least two satellites.

15. The method of providing medium-earth-orbit satellite-based communications of claim 12 wherein said apogee altitude is positioned over a northernmost latitude to be covered to maximize a coverage period thereof.

16. The method of providing medium-earth-orbit satellite-based communications of claim 1 wherein an elevation angle above 10° is maintained at said mobile handsets.

17. A medium-earth-orbit satellite-based communications system for providing communication between low-power mobile handsets having an omni-directional antenna and a gateway station through a satellite forming part of a satellite constellation, comprising:
    a plurality of satellites orbiting at an altitude between 5600 and 10000 nautical miles and oriented in a plurality of orbital planes, wherein each orbital plane is inclined at a predetermined inclination angle with respect to the equatorial plane of the earth, and wherein at least one of said satellites includes an antenna field of view (FOV) less than full earth coverage; and a plurality of relatively low-powered mobile handsets including omni-directional antennas for transmitting radio frequency (RF) signals to said satellites;

wherein a portion of a coverage region of a departing satellite overlaps a portion of a coverage region of an arriving satellite, and including assignment means having a predetermined criterion of assignment that calls placed to or from a user located within the coverage overlap region are assigned to said arriving satellite to minimize satellite-to-satellite handovers.

18. The medium-earth-orbit satellite-based communications system of claim 17 wherein a plurality of repeating coverage regions are assigned to each satellite.

19. The medium-earth-orbit satellite-based communications system of claim 18 wherein the attitude of at least one satellite is periodically adjusted to direct an antenna boresight on coverage regions assigned thereto.

20. The medium-earth-orbit satellite-based communications system of claim 18 wherein the antenna of at least one satellite is periodically rotated and gimballed to direct an antenna boresight on coverage regions assigned thereto.

21. The medium-earth-orbit satellite-based communications system of claim 17 wherein ascending nodes of said satellites orbiting in said orbital planes are evenly spaced on said equatorial plane.

22. The medium-earth-orbit satellite-based communications system of claim 17 wherein said orbits of said plurality of satellites are approximately circular.

23. The medium-earth-orbit satellite-based communications system of claim 17 wherein said orbits of said plurality of satellites are approximately elliptical.

24. The medium-earth-orbit satellite-based communications system of claim 23 wherein said plurality of satellites are oriented in three orbital planes, and wherein ascending nodes of said satellites orbiting in said orbital planes are spaced 120° on said equatorial plane.

25. The medium-earth-orbit satellite-based communications system of claim 24 wherein said inclination angle is approximately 55°, said orbit is approximately circular and said orbiting altitude is 5600 nautical miles.

26. The medium-earth-orbit satellite-based communications system of claim 25 wherein each orbital plane includes three satellites and wherein global coverage is continuously provided by at least one satellite.

27. The medium-earth-orbit satellite-based communications system of claim 25 wherein each orbital plane includes four satellites and wherein global coverage is continuously provided by at least two satellites.

28. The medium-earth-orbit satellite-based communications system of claim 24 wherein said inclination angle is approximately 63.4°, said orbit is approximately elliptical, an apogee altitude is 6300 nautical miles, and a perigee altitude is 600 nautical miles.

29. The medium-earth-orbit satellite-based communications system of claim 28 wherein each orbital plane includes two satellites and wherein hemispheric coverage is continuously provided by at least one satellite.

30. The medium-earth-orbit satellite-based communications system of claim 28 wherein each orbital plane includes three satellites and wherein hemispheric coverage is continuously provided by at least two satellites.

31. The medium-earth-orbit satellite-based communications system of claim 28 wherein said apogee altitude is positioned over a northernmost latitude to be covered to maximize a coverage period thereof.

32. The medium-earth-orbit satellite-based communications system of claim 17 wherein an elevation angle above 10° is maintained at said mobile handsets to prevent shadowing.

33. A method of providing medium-earth-orbit satellite-based communications between low-power mobile handsets having an omni-directional antenna and a gateway station through a satellite forming part of s satellite constellation, comprising the steps of:

launching a plurality of satellites to an orbiting altitude between 5600 and 10,000 nautical miles, wherein at least one satellite has an antenna field of view (FOV) less than a full earth coverage;

orienting said satellites in a plurality of orbital planes which are inclined at a predetermined inclination angle with respect to the equatorial plane of the earth;

receiving, by at least one of said satellites, radio frequency (RF) signals from a plurality of mobile handsets which transmit said RF signals using their omni-directional antennas;

overlapping a portion of a coverage region of a departing satellite with a portion of a coverage region of an arriving satellite, including assignment means having a predetermined criterion of assignment that calls placed to or from a user located within the coverage overlap region are assigned to said arriving satellite; and directing an antenna boresight on a sequence of coverage regions assigned thereto including at least one of periodically adjusting the attitude of at least one satellite to direct the antenna boresight on the current coverage region assigned thereto, and periodically gimballing and rotating the antenna of at least one satellite to direct the antenna boresight on the current coverage region assigned thereto.

34. A medium-earth-orbit satellite-based communications system for providing communication between low-power mobile handsets having an omni-directional antenna and an earth station through a satellite forming part of a satellite constellation, comprising:

a plurality of satellites orbiting at an altitude between 5600 and 10000 nautical miles and oriented in a plurality of orbital planes, wherein each orbital plane is inclined at a predetermined inclination angle with respect to the equatorial plane of the earth, and wherein at least one of said satellites includes an antenna having a field of view (FOV) less than full earth coverage;

a plurality of relatively low-power mobile handsets including omni-directional antennas for transmitting radio frequency (RF) signals to said satellites; and directing means for adjusting a boresight of said satellite antenna to provide directed coverage as the satellite orbits over a currently assigned service region, by performing at least one of periodically adjusting the attitude of the satellite to maintain the antenna boresight on the current service region, and periodically gimballing and rotating the antenna to maintain the antenna boresight on the current service region;

wherein a portion of a coverage region of a departing satellite overlaps a portion of a coverage region of an arriving satellite, and including assignment means having a predetermined criterion of assignment that calls placed to or from a user located within the coverage overlap region are assigned to said arriving satellite to minimize satellite-to-satellite handovers.

35. A medium-earth-orbit, satellite-based cellular telecommunications system, comprising:

a constellation of telecommunications satellites providing a multibeam radio frequency (rf) communications link for a number of mobile cellular telephones having omni-directional antennas, the satellites being placed in a plurality of inclined orbits about the earth at an altitude of between approximately 5600 and 10,000 nautical miles, such that the station-to-station propagation delay time of said communication link is no less than 60 milli-seconds and no more than 150 milli-seconds;

wherein at least one satellite includes a multi-beam antenna and directing means for adjusting the antenna boresight to provide directed antenna coverage as the satellite orbits over a currently assigned service region for the satellite;

wherein the characteristics of these orbits, such as the number of orbits, the inclination of each orbit, the number of satellites in each orbit and the altitude of the satellites, are tailored to maximize the coverage area of the satellites and their related line-of-sight elevation angles for predetermined service regions of the earth, while minimizing propagation time delays, the number of beam-to-beam and satellite-to-satellite handovers, and the total number of satellites; and wherein the number of satellite-to-satellite handovers is further reduced by overlapping a portion of a coverage region of a departing satellite with a portion of a coverage region of an arriving satellite, including assignment means having a predetermined criterion of assignment that calls placed to or from a user located within the coverage overlap region are assigned to said arriving satellite.

* * * * *